(12) United States Patent
Adelson

(10) Patent No.: US 8,275,358 B1
(45) Date of Patent: Sep. 25, 2012

(54) PROVIDING NOTICE AND RECEIVING CONSENT TO OBTAIN LOCATION INFORMATION OF A MOBILE DEVICE

(75) Inventor: Bennett H. Adelson, Beachwood, OH (US)

(73) Assignee: MacroPoint LLC, Cleveland, OH (US)

(*) Notice: Subject to any disclaimer, the term of this patent is extended or adjusted under 35 U.S.C. 154(b) by 0 days.

(21) Appl. No.: 13/409,281

(22) Filed: Mar. 1, 2012

(51) Int. Cl.
*H04M 1/66* (2006.01)

(52) U.S. Cl. .................. 455/411; 455/456.1; 455/456.2; 455/415; 455/404.2; 455/413

(58) Field of Classification Search .............. 455/456.1, 455/456.2, 456.3, 456.5, 413, 415, 418, 404.2; 370/310, 328, 338; 701/32.3, 32.4, 32.5, 701/400, 451
See application file for complete search history.

(56) References Cited

U.S. PATENT DOCUMENTS 6,442,391 B1 * 8/2002 Johansson et al. ......... 455/456.2
2008/0132252 A1 * 6/2008 Altman et al. ................ 455/457
* cited by examiner

*Primary Examiner* — Kathy Wang-Hurst
(74) *Attorney, Agent, or Firm* — Renner, Otto, Boisselle & Sklar, LLP

(57) ABSTRACT

A system for receiving user consent to obtaining location information of a mobile device includes a communications interface configured for communication with a mobile device, a validation logic configured to identify the mobile device at least in part by obtaining an identifier associated with the mobile device, and a notification logic configured to communicate a signal including data representing an automated voice message. The automated voice message provides a notice or the location of a notice including information indicating to the user of the mobile device that consenting to the obtaining of the location information of the mobile device would result in the location information of the mobile device being disclosed. The communications interface is configured to transmit the automated voice message to the mobile device, and to receive from the mobile device data indicating the user consent for obtaining the location information of the mobile device.

30 Claims, 6 Drawing Sheets

PROVIDING NOTICE AND RECEIVING CONSENT TO OBTAIN LOCATION INFORMATION OF A MOBILE DEVICE

TECHNICAL FIELD

The present disclosure relates to systems and methods for obtaining the location of an electronic device. More specifically, the present disclosure relates to systems and methods for providing notification to and receiving consent from a user whose mobile device's location is to be obtained.

BACKGROUND

Location information is becoming more important and prevalent.

In one example application of the use of location information, carriers, shippers, freight hauling services providers, third-party logistics service providers and courier services providers as well as other logistics and freight service providers (freight hauling) benefit from obtaining the location of vehicles in their fleets or under contract. Obtaining the location of vehicles helps improve efficiency because it allows for real-time or near real-time decision making when matching loads with vehicles. For example, by obtaining the location of fleet vehicles, a dispatcher may better understand which vehicle is the most appropriate (e.g., geographically closest, appropriate size, etc.) to send to a location for a load pickup. Conventional systems for obtaining vehicle location have relied on global positioning systems (GPS) to provide the vehicle's location. Some of these systems require the installation of dedicated equipment in the vehicles, which may be an expensive proposition.

Similar and additional benefits may be obtained from the use of location information in applications other than freight hauling.

SUMMARY

Alternative methods for obtaining location information include cellular triangulation or multilateration methods that are capable of locating mobile devices in a cellular network. These methods involve the measurement of radio signals strength between a mobile device and radio towers in the network. The technology, originally intended by telecommunication companies to approximate the location of a mobile phone, provides the location of the mobile phone and, presumably, the location of its user. In one example, where the user of the mobile device is the driver of a freight vehicle, this technology may be used to obtain the location of the vehicle.

The use of this location information technology, however, raises privacy issues. A user's privacy may be at risk if location information is misused or disclosed without the authorization or knowledge of the user. To address these privacy concerns, various governmental and business organizations have developed rules and guidelines to protect user privacy. For example, the International Association for the Wireless Telecommunications Industry (CTIA) has developed Best Practices and Guidelines for Location-Based Services (the "CTIA Guidelines"), which are hereby incorporated by reference.

The Guidelines provide a framework based on two principles: user notice and consent. Users must receive "meaningful notice about how location information will be used, disclosed and protected so that users can make informed decisions . . . and . . . have control over their location information." Users must also "consent to the use or disclosure of location information" and "have the right to revoke consent . . . at any time."

Although, electronic methods have been developed that make use of web browsers and SMS texting capabilities of mobile devices to provide notification and consent, some of these systems have proved inconvenient and may require advanced mobile devices or extensive user training.

In one embodiment of the present invention, a method for receiving consent from a user to obtain location information of a mobile device includes participating in a telephone call with the mobile device, identifying the mobile device at least in part by obtaining an identifier associated with the mobile device, communicating to the user via an automated voice message transmitted to the mobile device at least one of (a) a notice including information indicating that consenting to the obtaining of the location information of the mobile device would result in the location information of the mobile device being disclosed, and (b) a location at which to find the notice. The method further includes receiving from the mobile device a signal including data indicating user consent to obtain the location information of the mobile device.

In one embodiment, a method for receiving from a user a revocation of consent to obtain location information of a mobile device includes participating in a telephone call with the mobile device, identifying the mobile device at least in part by obtaining an identifier associated with the mobile device, communicating to the user via an automated voice message transmitted to the mobile device information indicating that consent to obtain the location information is revocable via the mobile device, and receiving from the mobile device a signal including data indicating revocation of the consent to obtain the location information of the mobile device.

In one embodiment, a system for receiving user consent to obtain location information of a mobile device includes a communications interface configured for communication with a mobile device, a validation logic configured to identify the mobile device at least in part by obtaining an identifier associated with the mobile device, and a notification logic configured to communicate a signal including data representing an automated voice message including at least one of (a) a notice including information indicating to the user of the mobile device that consenting to the obtaining of the location information of the mobile device would result in the location information of the mobile device being disclosed and (b) a location at which to find the notice. The communications interface is configured to transmit the automated voice message to the mobile device and to receive from the mobile device data indicating the user consent to obtaining the location information of the mobile device.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

In the present disclosure, embodiments are described in the context of location information of freight hauling vehicles. It will be appreciated, however, that the exemplary context of freight hauling vehicles is not the only operational environment in which aspects of the disclosed systems and methods may be used. Therefore, the techniques described in this disclosure may be applied to any type of appropriate electronic device whose location information may be of interest.

Figure 1:
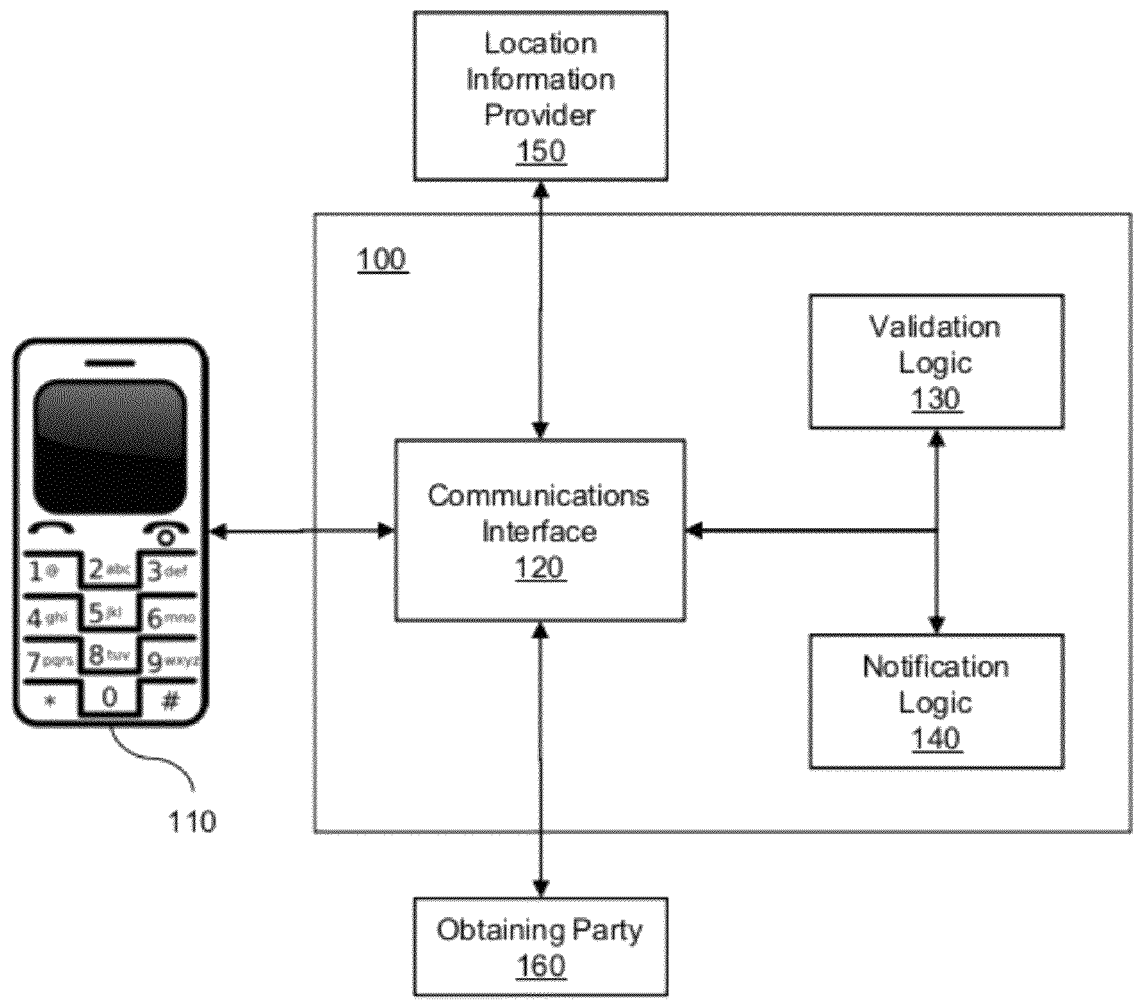
FIG. 1 illustrates an exemplary system for providing user notification and receiving user consent to obtaining location information of a mobile device associated with the user.

FIG. 1 illustrates an exemplary system 100 for providing user notification and receiving user consent to obtaining location information of a mobile device 110 associated with the user. The system 100 includes a communications interface 120 configured for communication with the mobile device 110. The communications interface 120 is configured to participate in telephone calls with the mobile device 110. In one embodiment, the communication interface 120 is associated with a toll free number such as a 1-800 number. The user of the mobile device 110 may initiate a telephone call by dialing the toll free number. In another embodiment, the communications interface is associated with a number other than a toll free number. In yet another embodiment, the communications interface 120 is configured to initiate the telephone call.

The system 100 further includes a validation logic 130 that is configured to identify the mobile device 110 at least in part by obtaining an identifier associated with the mobile device 110. Obtaining the identifier associated with the mobile device 110 ensures that the right party, the user, is notified that location information of the mobile device 110 will be used and that the right party, the user, consents to the use of the location information. In one embodiment, the identifier is a telephone number associated with the mobile device 110. In one embodiment, where the communications interface 120 is associated with a toll free number as discussed above, the validation logic 130 is configured to identify the mobile device 110 at least in part by obtaining the telephone number associated with the mobile device 110 via automatic number identification (ANI). In other embodiments, the identifier is an identifier other than a telephone number. For example, the identifier may be a mobile identification number (MIN), an electronic serial number (ESN), an International Mobile Equipment Identity (IMEI), an International Mobile Subscriber Identity (IMSI), a Mobile Equipment Identifier (MEID), a Manufacturer's Serial Number (MSN), a Mobile Subscriber Integrated Services Digital Network (MSISDN) number, a Media Access Control (MAC) address, combinations thereof, and so on.

The system 100 further includes a notification logic 140 that is configured to communicate a signal including data representing an automated voice message. In one embodiment, the automated voice message provides a notice to the user of the mobile device 110 that includes information indicating to the user that consenting to the obtaining of the location information of the mobile device 110 would result in the location information of the mobile device 110 being disclosed. In another embodiment, the automated voice message provides to the user of the mobile device 110 a location (web address, etc.) where the user can find the notice indicating to the user that consenting to the obtaining of the location information of the mobile device 110 would result in the location information of the mobile device 110 being disclosed. For example, the automated voice message may indicate that the notice may be found at a web address and provide the web address to the user.

The communications interface 120 is configured to receive the automated message signal communicated by the notification logic 140 and transmit the automated voice message to the mobile device 110. The communications interface 120 is further configured to receive from the mobile device 110 data indicating the user consent for obtaining the location information of the mobile device 110.

In one embodiment, the automated voice message communicates to the user that the user may indicate the user's consent to the obtaining of the location information of the mobile device 110 by performing an action on the mobile device (e.g., "to indicate your consent to the obtaining of your telephone's location information, please press 1.") In this embodiment, the communications interface 120 is configured to receive data indicating that an action was performed on the mobile device 110, which indicates the user's consent (e.g., the user pressed 1).

In another embodiment, the automated voice message communicates to the user that the user may indicate the user's consent to the obtaining of the location information of the mobile device 110 by speaking a particular word or phrase to be received by the mobile device 110 (e.g., "to indicate your consent to the obtaining of your telephone's location information, please say 'yes.'") In this embodiment, the communications interface 120 is configured to receive a voice command from the mobile device 110, which indicates the user's consent (e.g., the user said "yes").

In one embodiment, upon receiving the data indicating the user consent for obtaining the location information of the mobile device 110, the communications interface 120 transmits a request for the location information of the mobile device 110 and receives the location information of the mobile device. The request for the location information of the mobile device 110 includes the identifier associated with the mobile device 110.

In the illustrated embodiment, upon receiving the data indicating the user consent for obtaining the location information of the mobile device 110, the communications interface 120 transmits a request for the location information of the mobile device 110 to a location information provider 150 and receives the location information of the mobile device from the location information provider 150. The location information provider 150 is a party that has access to the mobile device's location information.

In one embodiment, the location information provider 150 is a wireless service provider. In another embodiment, the location information provider 150 is a third party that receives the location information from the wireless service provider. In yet another embodiment, the location information provider 150 is a party other than the wireless service provider or a third party. For example, the party seeking to obtain the location information, the obtaining party 160 may have access to the location information. In another example, the party operating the system 100 may have access to the location information.

In one embodiment, the communications interface 120 is further configured to communicate the location information to the obtaining party 160. In an example involving freight hauling services providers or freight carriers, the obtaining party may be a carrier who is interested in obtaining the location of its vehicles or vehicles under contract. In one embodiment, multiple parties may be interested in obtaining the location of the same vehicles and so the communications interface is configured to communicate the location information to multiple parties.

In one embodiment, the communications interface 120 is configured to communicate the location information to the obtaining party 160 by transmitting the location information of the mobile device to the obtaining party 160 through computer communication. The location information may then be displayed in a user interface (not shown). In another embodiment, the communications interface 120 is configured to communicate the location information to the obtaining party 160 by exposing an application programming interface (API) through which the obtaining party 160 can access the location information of the mobile device 110. The obtaining party 160 can make use of the API to make the information available to its enterprise software (e.g., SAP, Oracle, etc.)

The CTIA Guidelines further state that mobile device users must be allowed to "revoke their prior consent to use or disclose location information." In one embodiment, the notification logic 140 is further configured to communicate a signal including data representing a second automated voice message indicating that consent to obtain the location information is revocable via the mobile device 110. In this embodiment, the communications interface 120 is configured to communicate to the mobile device 110 the second automated voice message and to receive confirmation of consent or revocation of consent to obtain the location information of the mobile device 110 from the user.

In one embodiment, the second automated voice message communicates to the user that to indicate the user's confirmation of consent or the user's revocation of consent to the obtaining of the location information of the mobile device 110, the user must perform an action on the mobile device 110 (e.g., "to indicate that you wish to revoke consent to the obtaining of your telephone's location information, please press 1.") In this embodiment, the communications interface 120 is configured to receive data indicating that an action was performed on the mobile device 110, which indicates the user's confirmation or revocation of consent (e.g., the user pressed 1).

In another embodiment, the second automated voice message communicates to the user that to indicate the user's confirmation of consent or the user's revocation of consent to the obtaining of the location information of the mobile device 110, the user must speak a particular word or phrase to be received by the mobile device 110 (e.g., "to indicate your confirmation of consent to the obtaining of your telephone's location information, please say 'confirmed.'") In this embodiment, the communications interface 120 is configured to receive a voice command from the mobile device 110, which indicates the user's confirmation or revocation of consent (e.g., the user said "confirmed").

In one embodiment, the user is given the option to temporarily revoke consent to the disclosure of location information. For example, a driver may wish to make available his location to a carrier during certain hours during the work week, but may not want the carrier to be able to obtain the driver's location during the weekend. The driver may operate the mobile device 110 to indicate a date and time when the driver wishes for the sharing of his location information to end or resume. Or the driver may operate the mobile device 110 to indicate an interval of time (e.g., 2 hours) during which the driver wishes to hide the driver's location. In this embodiment, the communications interface 120 is configured to receive data indicating a time until which consent to obtain the location information of the mobile device 110 is granted or revoked, or an interval of time during which consent to obtain the location information of the mobile device is granted or revoked.

In one embodiment, the user is given the option to temporarily revoke consent to the disclosure of location information by texting (e.g., SMS message) the term "hide" using the mobile device 110. In one embodiment, the user is given the option to indicate consent to the disclosure of location information by texting (e.g., SMS message) the term "share" using the mobile device 110. In this embodiment, the communications interface 120 is configured to receive the text message as sent by the mobile device 110, which indicates the user's confirmation or revocation of consent. In another embodiment, the user may speak the terms "hide" or "share" to temporarily revoke consent or to indicate consent to the disclosure of location information, respectively. In this embodiment, the communications interface 120 is configured to receive a voice command from the mobile device 110, which indicates the user's confirmation or revocation of consent.

In one embodiment, when the location information of the mobile device 110 is being disclosed, the notification logic 140 is further configured to periodically generate and the communications interface 120 is further configured to periodically communicate a reminder notification message reminding the user that the location information of the mobile device 110 is currently being disclosed. In one embodiment, the system 100 reminds the user every 30 days that the location information of the mobile device 110 is currently being disclosed. In another embodiment, the system 100 reminds the user more or less often than every 30 days that the location information of the mobile device 110 is currently being disclosed.

In one embodiment, the communications interface 120 reminds the user in an automated voice message that the location information of the mobile device 110 is currently being disclosed. In another embodiment, the communications interface 120 reminds the user in an SMS message that the location information of the mobile device 110 is currently being disclosed. In yet another embodiment, the communications interface 120 reminds the user via electronic communication other than an automated voice message and an SMS message that the location information of the mobile device 110 is currently being disclosed.

Figure 2:
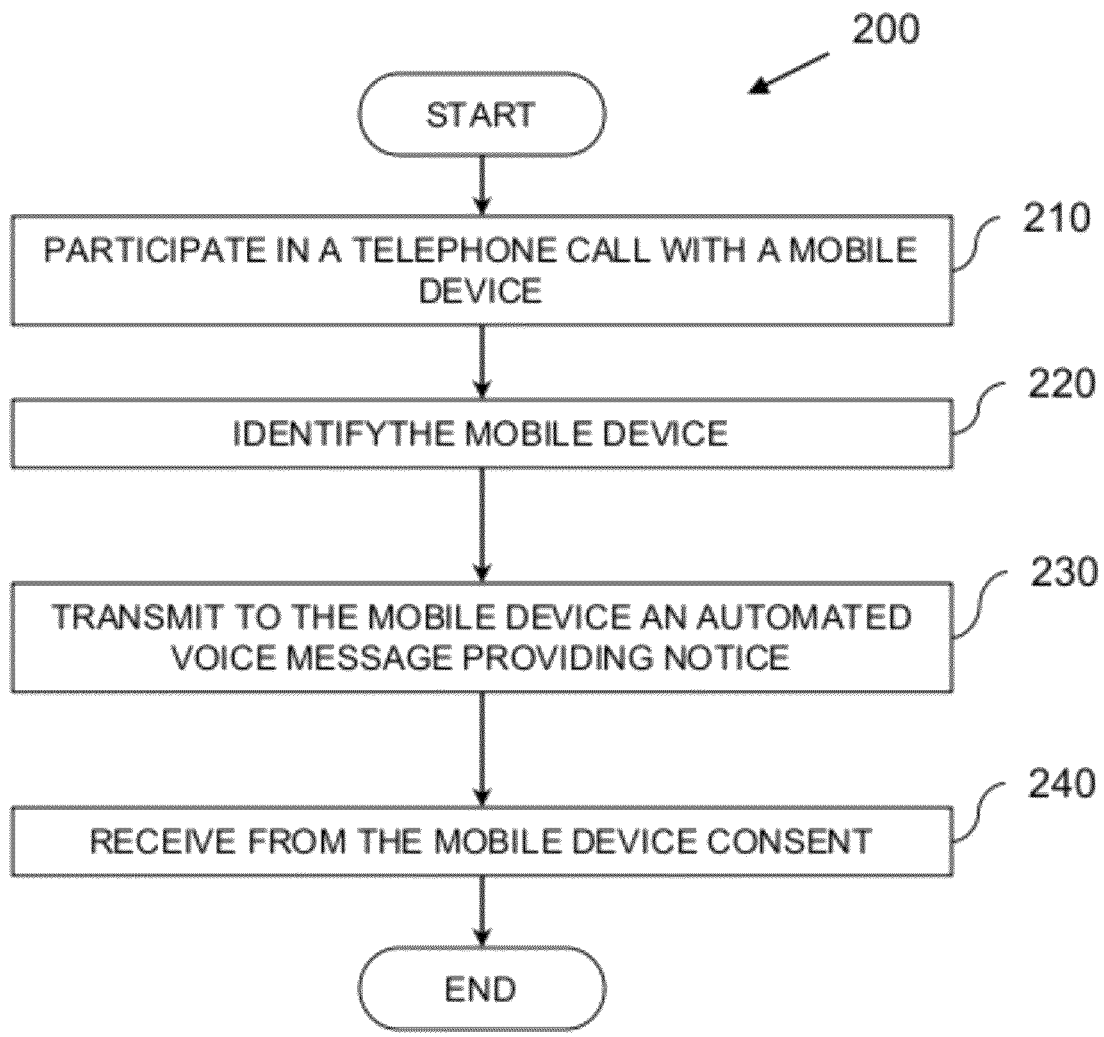
FIG. 2 illustrates an exemplary method for receiving consent from a user to obtaining location information of a mobile device associated with the user.
Figure 3:
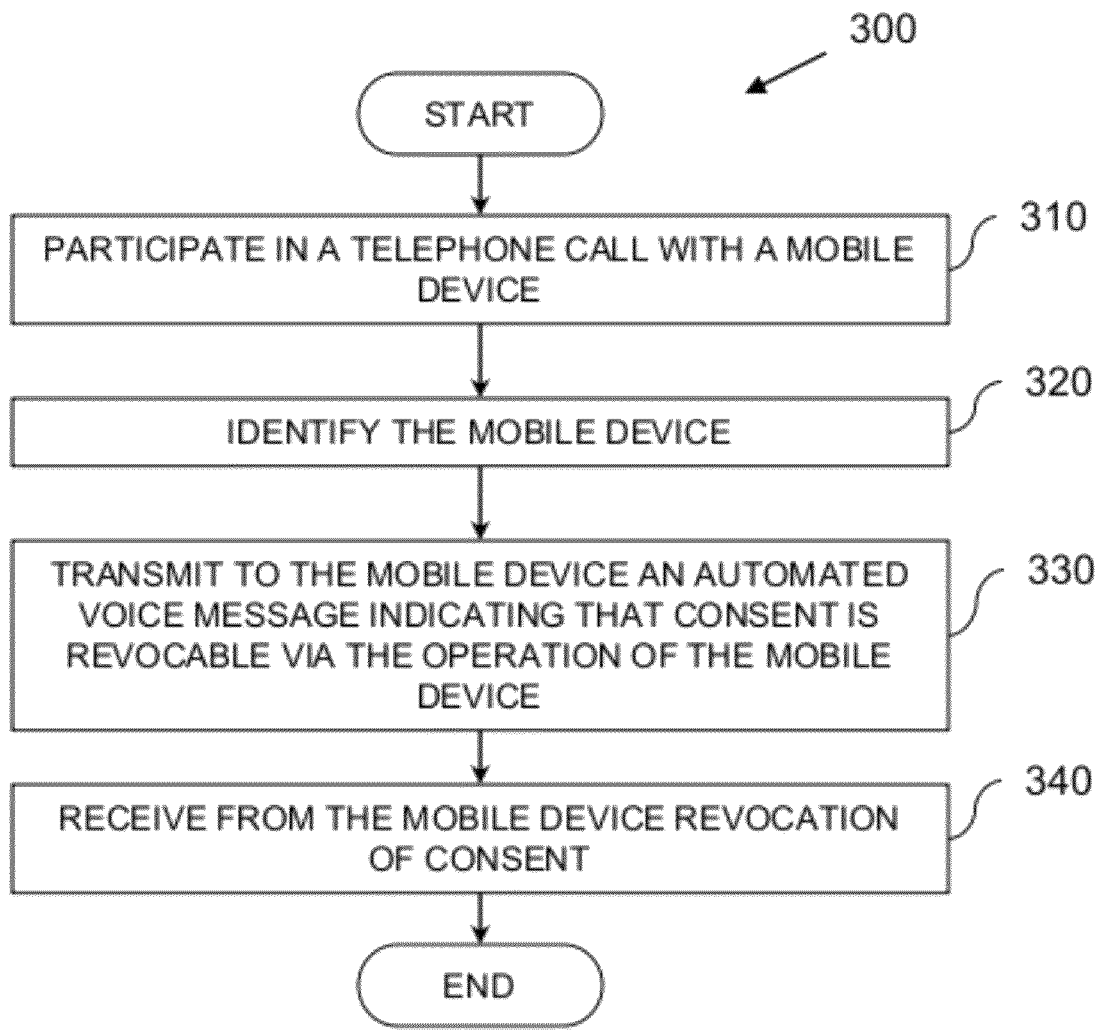
FIG. 3 illustrates an exemplary method for receiving from a user a revocation of consent to obtain location information of a mobile device.

Example methods may be better appreciated with reference to the flow diagrams of FIGS. 2 and 3. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional, not illustrated blocks.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

In one example, methodologies are implemented as processor executable instructions or operations provided on a computer-readable medium. Thus, in one example, a computer-readable medium may store processor executable instructions operable to perform the methods of FIGS. 2 and 3.

While FIGS. 2 and 3 illustrate various actions occurring in serial, it is to be appreciated that various actions illustrated in FIGS. 2 and 3 could occur substantially in parallel. While a number of processes are described, it is to be appreciated that a greater or lesser number of processes could be employed and that lightweight processes, regular processes, threads, and other approaches could be employed. It is to be appreciated that other example methods may, in some cases, also include actions that occur substantially in parallel.

FIG. 2 illustrates an exemplary method 200 for receiving consent from a user to obtaining location information of a mobile device associated with the user. At 210, the method 200 includes participating in a telephone call with the mobile device. In one embodiment, the user of the mobile device initiates the telephone call. In another embodiment, the user of the mobile device receives the telephone call. At 220, the method 200 includes identifying the mobile device at least in part by obtaining an identifier associated with the mobile device. In one embodiment, the identifier is a telephone number associated with the mobile device. In one embodiment, the mobile device user places the telephone call to a toll free number and the identifying the mobile device includes obtaining a telephone number associated with the mobile device via automatic number identification (ANI).

In other embodiments, the identifier is an identifier other than a telephone number. For example, the identifier may be a mobile identification number (MIN), an electronic serial number (ESN), an International Mobile Equipment Identity (IMEI), an International Mobile Subscriber Identity (IMSI), a Mobile Equipment Identifier (MEID), a Manufacturer's Serial Number (MSN), a Mobile Subscriber Integrated Services Digital Network (MSISDN) number, a Media Access Control (MAC) address, combinations thereof, and so on.

At 230, the method 200 includes transmitting to the mobile device a signal including data representing an automated voice message. The automated voice message communicates to the user of the mobile device at least one of: (a) a notice including information indicating that consenting to the obtaining of the location information of the mobile device would result in the location information of the mobile device being disclosed, or (b) a location at which to find the notice.

At 240, the method 200 includes receiving from the user via the mobile device consent for obtaining the location information of the mobile device.

In one embodiment, the receiving from the mobile device consent for obtaining the location information of the mobile device includes receiving data indicating that the user of the mobile device has performed an action on the mobile device. For example, the user may have pressed a key in the mobile device, touched or swipe a particular portion of the device's screen, shaken the mobile device, combinations thereon and so on. In another embodiment, the receiving from the mobile device consent for obtaining the location information of the mobile device includes receiving a voice command from the mobile device.

In one embodiment, once consent has been obtained from the user of the mobile device, the method 200 includes periodically communicating to the user via the mobile device a notification message indicating that the location information of the mobile device is being disclosed.

In one embodiment, after receiving from the user consent for obtaining the location information of the mobile device, the method 200 includes transmitting a request for the location information of the mobile device and receiving the location information of the mobile device.

In one embodiment, after receiving the location information of the mobile device, the method 200 includes communicating the location information to an obtaining party. In one embodiment, communicating the location information to the obtaining party includes: (a) transmitting the location information of the mobile device to the obtaining party through computer communication, or (b) exposing an application programming interface (API) from which the obtaining party can access the location information of the mobile device.

FIG. 3 illustrates an exemplary method 300 for receiving from a user a revocation of consent to obtain location information of a mobile device. At 310, the method 300 includes participating in a telephone call with the mobile device. In one embodiment, the user of the mobile device initiates the telephone call. In another embodiment, the user of the mobile device receives the telephone call. At 320, the method 300 includes identifying the mobile device at least in part by obtaining an identifier associated with the mobile device. In one embodiment, the identifier is a telephone number associated with the mobile device. In one embodiment, the user places the telephone call to a toll free number and the identifying the mobile device includes obtaining a telephone number associated with the mobile device via automatic number identification (ANI). In other embodiments, the identifier is an identifier other than a telephone number as discussed above in reference to method 200.

At 330, the method 300 includes communicating to the user via an automated voice message transmitted to the mobile device information indicating that consent to obtain the location information is revocable via the mobile device. At 340, the method 300 includes receiving from the mobile device revocation of the consent to obtain the location information of the mobile device.

In one embodiment, the receiving from the mobile device revocation of consent for obtaining the location information of the mobile device includes receiving data indicating that the user of the mobile device has performed an action on the mobile device. For example, the user may have pressed a key in the mobile device, touched or swipe a particular portion of the device's screen, shaken the mobile device, combinations thereon and so on. In another embodiment, the receiving from the mobile device revocation of consent for obtaining the location information of the mobile device includes receiving a voice command from the mobile device.

In one embodiment, the revocation of consent is temporary, and the receiving from the mobile device revocation of the consent to obtain the location information of the mobile device includes receiving data indicating (a) a time at which consent to obtain location information of the mobile device is revoked, (b) a time until which the consent to obtain the location information of the mobile device is revoked, or (c) an interval of time during which the consent to obtain the location information of the mobile device is revoked. Consent is revoked at the time indicated or at the beginning of the indicated interval of time. Consent is unrevoked at the indicated time until which the consent to obtain the location information of the mobile device is revoked or upon expiration of the indicated interval of time during which the consent to obtain the location information of the mobile device is revoked.

In one embodiment, the user is given the option to temporarily revoke consent to the disclosure of location information by texting (e.g., SMS message) the term "hide" using the mobile device 110. In one embodiment, the user is given the option to indicate consent to the disclosure of location information by texting (e.g., SMS message) the term "share" using the mobile device 110. In another embodiment, the user may speak the terms "hide" or "share" to temporarily revoke consent or to indicate consent to the disclosure of location information, respectively.

Figure 4:
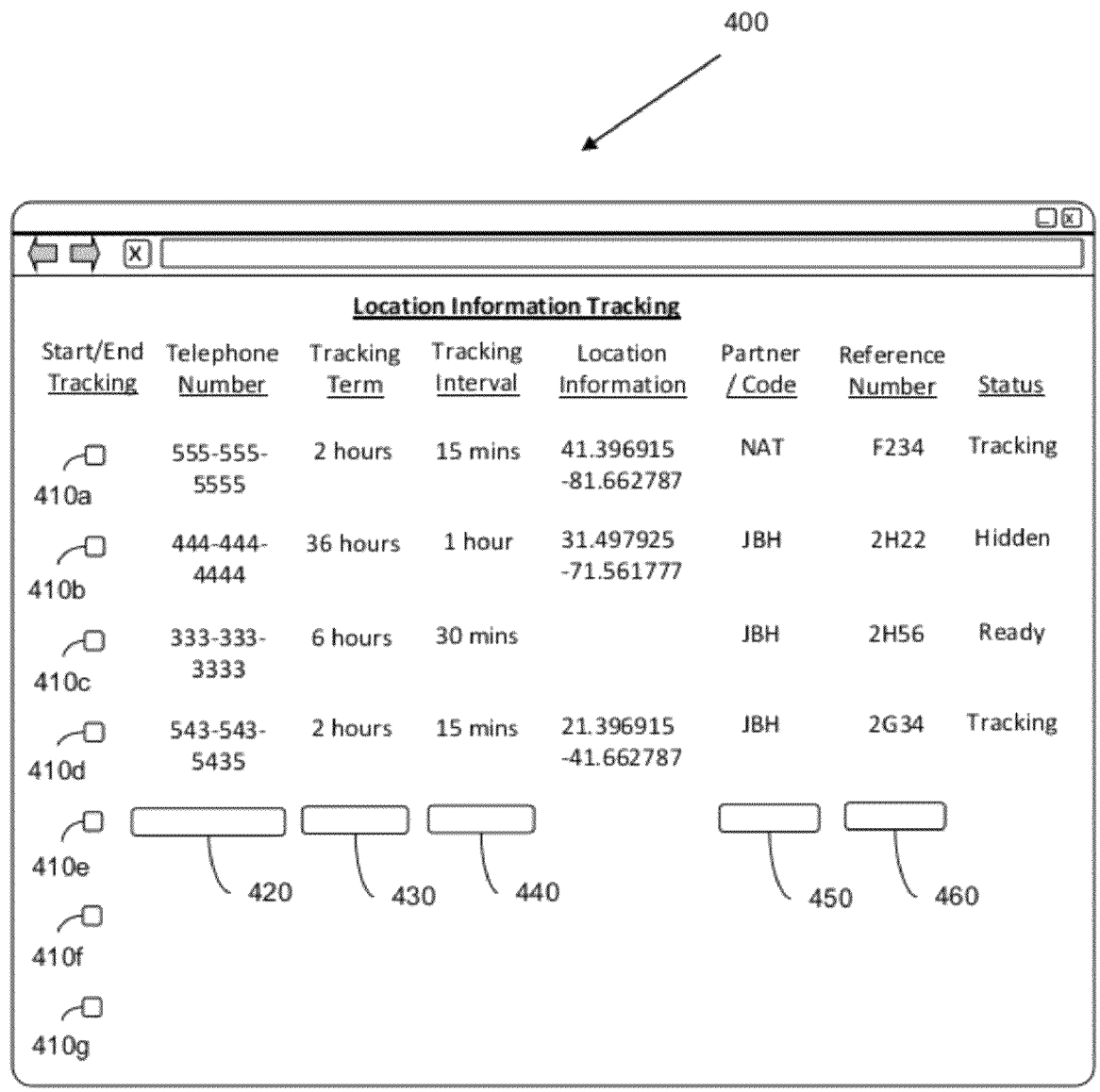
FIG. 4 illustrates an exemplary user interface for use in conjunction with a system for obtaining location information of a mobile device.

FIG. 4 illustrates an exemplary user interface 400 for use in conjunction with a system for obtaining location information of a mobile device. The user interface 400 is operable by the obtaining party (e.g., carrier) to set up obtaining of location information, display information regarding obtaining of location information, and display location information.

In the illustrated embodiment, the user interface 400 displays Start/End Obtaining buttons 410*a-g* operable by a user to end and start obtaining of the location information of a mobile device. The user interface 400 further displays the Telephone Number corresponding to the mobile device to be obtained. The user interface 400 further displays the Tracking Term, which corresponds to the amount of time that the associated Telephone Number will be obtained. The user interface 400 further displays the Tracking Interval, which corresponds to how often the location information corresponding to the Telephone Number is updated. In the illustrated embodiment, the user interface 400 displays the Location Information as latitude and longitude coordinates. In another embodiment, the user interface 400 displays the Location Information in a format other than latitude and longitude coordinates. In one embodiment, a user may click on the Location Information to display a map that includes a mark indicating the location of the mobile device associated with the Telephone Number on the map.

In the illustrated embodiment, the user interface displays a Partner/Code. The Partner/Code field may display a code corresponding to a partner company or driver. For example, a carrier A may subcontract with another carrier NAT to move freight from location 1 to location 2. The user interface displays the carrier NAT associated with the Telephone Number 555-555-5555.

The user interface 400 further displays a Reference Number. In one embodiment, the Reference Number field is a customizable field that carriers can use to identify a particular load, a particular vehicle, a particular order, etc. In one embodiment, the Reference Number appears in invoices and other documents to facilitate efficient system administration.

The user interface 400 further displays the Status of the mobile device associated with the Telephone Number. For example, the Status may indicate that the system is Tracking the mobile device. In another example, the Status may display that the mobile device is Hidden to indicate that the user of the mobile device has temporarily revoked consent to disclosure of the mobile device's location information. Other possible Status indicators include: (a) Ready to obtain, which indicates that the obtaining of the location information is setup and the system is awaiting location information data, (b) Expired, which indicates that the Tracking Term has expired, and (c) Denied, which indicates that the user denied consent to obtaining of the location information.

In one embodiment, the user interface 400 is used to add mobile devices whose location is to be obtained. A user may use field 420 to enter the Telephone Number of the mobile device whose location is to be obtained. In one embodiment (not illustrated), the user interface 400 provides a pull-down menu from which the user may chose a Telephone Number. The user may further enter the Tracking Term in field 430, the Tracking Interval in field 440, the Partner/Code in field 450 and the Reference Number in field 460. In one embodiment (not illustrated), the user interface 400 provides each of these fields as pull-down menus.

In some cases, the obtaining party user may not know the Telephone Number of the mobile device or the user may know the Telephone Number but not have authorization to obtain the mobile device associated with the Telephone Number. In one embodiment (not shown), the user may enter a Partner/Code that serves as verification that the user has obtained authorization from the partner to obtain location information of the mobile device associated with the Telephone Number. This feature may also serve to keep the user from learning the telephone number of the mobile device in cases where the mobile device user, the partner, or some other party desires not to reveal the telephone number to the obtaining party user.

In one embodiment, the mobile device user may enter the Partner/Code. For example, the mobile device user may be an independent driver who wishes for the location information of his mobile device to be obtained by a carrier so that the carrier may assign freight for the driver to haul. However, the carrier may not want every driver in the field to do this freely because of the potential costs associated with obtaining of the location information of a large number of drivers. The carrier may require the driver to enter a Partner/Code obtained from the carrier that serves as verification that the driver has obtained authorization from the carrier for the location information of his mobile device to be obtained by the carrier.

Figure 5:
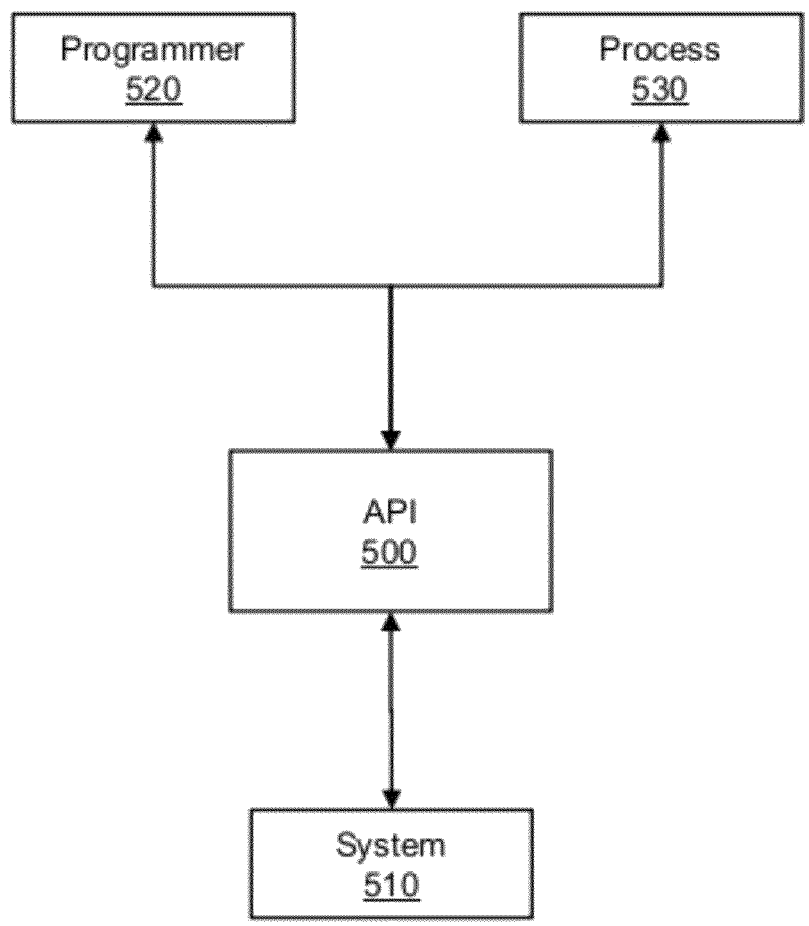
FIG. 5 illustrates an exemplary application programming interface (API) for providing access to a system for communicating location information of mobile device.

Referring now to FIG. 5, an application programming interface (API) 500 is illustrated providing access to a system 510 for communicating location information of a mobile device to an obtaining party. The API 500 can be employed, for example, by a programmer 520 or a process 530 to gain access to processing performed by the system 510. For example, a programmer 520 can write a program to access the system 510 (e.g., invoke its operation, obtain its operation, set up its operation, obtain location information) where writing the program is facilitated by the presence of the API 500. Rather than programmer 520 having to understand the internals of the system 510, the programmer 520 merely has to learn the interface to the system 510. This facilitates encapsulating the functionality of the system 510 while exposing that functionality.

Similarly, the API 500 can be employed to provide data values to the system 510 or retrieve data values from the system 510. For example, a process 530 that processes location information of a mobile device can provide a telephone number to the system 510 via the API 500 by, for example, using a call provided in the API 500. Thus, in one example of the API 500, a set of application programming interfaces can be stored on a computer-readable medium. The interfaces can be employed by a programmer, computer component, logic, and so on, to gain access to a system 510 for obtaining location information of a mobile device.

Figure 6:
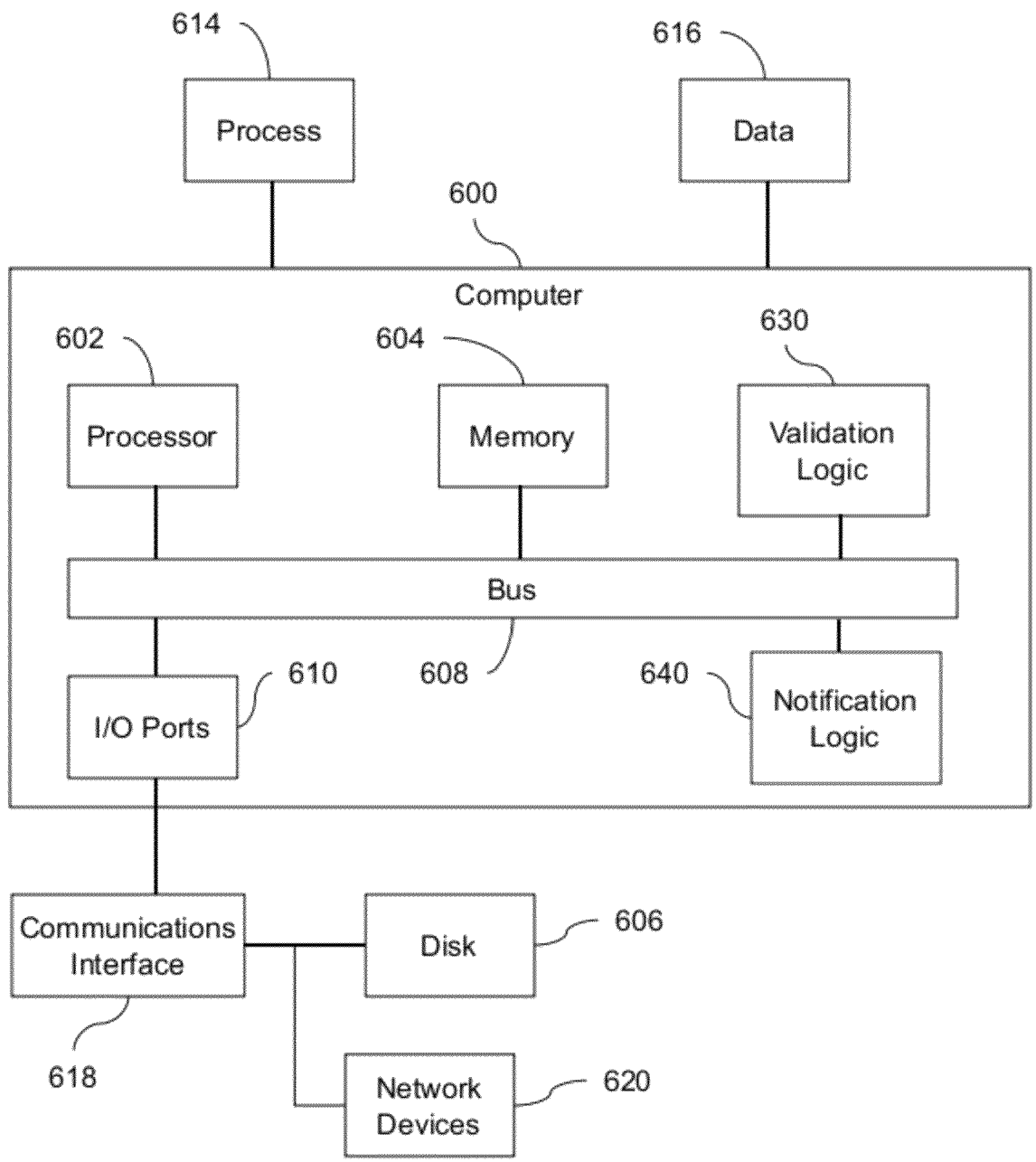
FIG. 6 illustrates an exemplary computer system where a system for providing user notification and receiving user consent to obtaining location information of a mobile device associated with the user may be implemented.

FIG. 6 illustrates a computer 600 that includes a processor 602, a memory 604, and I/O Ports 610 operably connected by a bus 608. In one example, the computer 600 may include a validation logic 630 configured to facilitate validation of a mobile device. Thus, the validation logic 630, whether implemented in computer 600 as hardware, firmware, software, or a combination thereof may provide means for identifying the mobile device at least in part by obtaining an identifier associated with the mobile device. In another example, the computer 600 may include a notification logic 640 configured to provide notification to the user of the mobile device. Thus, the notification logic 640, whether implemented in computer 600 as hardware, firmware, software, or a combination thereof may provide means for communicating a signal including data representing automated voice messages that provide notices or directs the user of the mobile device to notices that include information indicating (a) that consenting to the obtaining of the location information of the mobile device will result in the location information of the mobile device being disclosed, (b) that the user may revoke notice by operation of the mobile device, and so on. The validation logic 630 and the notification logic 640 may be permanently or removably attached to the computer 600.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, a communications interface (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the computer 600.

The bus 608 can be a single internal bus interconnect architecture or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The computer 600 may interact with input/output devices via communications interface 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The computer 600 can operate in a network environment and thus may be connected to network devices 620 via the communications interface 618, or the I/O Ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, LTE networks, GSM networks, GPRS networks, CDMA networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples, forms, or both of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process or thread of execution and a computer component can be localized on one computer or distributed between two or more computers.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

A "logic," as used herein, includes but is not limited to hardware, firmware, software or combinations of each to perform a function(s) or an action(s), or to cause a function or action from another logic, method, or system. For example, based on a desired application or needs, a logic may include a software controlled microprocessor, discrete logic like an application specific integrated circuit (ASIC), a programmed logic device, a memory device containing instructions, or the like. A logic may include one or more gates, combinations of gates, or other circuit components. A logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A computer implemented method for receiving consent from a user of a mobile device to obtaining location information of the mobile device, the method comprising:
    participating in a telephone call with the mobile device;
    within the telephone call, identifying the mobile device at least in part by obtaining an identifier associated with the mobile device;
    transmitting to the mobile device during the telephone call an automated voice message communicating to the user of the mobile device at least one of:
        a notice including information indicating that consenting to the obtaining of the location information of the mobile device would result in the location information of the mobile device being disclosed, and
        a location at which to find the notice, wherein the location at which to find the notice is represented by a web address corresponding to a website where, during the telephone call, the user can find the notice indicating to the user that consenting to the obtaining of the location information of the mobile device would result in the location information of the mobile device being disclosed; and
    receiving from the mobile device during the telephone call a signal including data indicating consent for obtaining the location information of the mobile device.

2. The method of claim 1, wherein the telephone call is a toll free call and the identifying the mobile device includes obtaining a telephone number associated with the mobile device via automatic number identification (ANI).

3. The method of claim 1, further comprising:
    periodically transmitting an automated voice message communicating to the user via the mobile device a notification message indicating that the location information of the mobile device is currently being disclosed.

4. The method of claim 1, wherein the receiving from the mobile device a signal including data indicating consent for obtaining the location information of the mobile device includes at least one of:
    receiving data indicating that the user of the mobile device has performed an action on the mobile device; and
    receiving a voice command from the mobile device.

5. The method of claim 1, wherein the signal including data received from the mobile device indicating the user consent for obtaining the location information of the mobile device corresponds to an SMS message including the term "share".

6. The method of claim 1, further comprising:
    after receiving from the user consent for obtaining the location information of the mobile device, transmitting a signal including data representing a request for the location information of the mobile device, wherein the request includes the identifier associated with the mobile device; and
    receiving a signal including data indicating the location information of the mobile device.

7. The method of claim 6, further comprising:
    communicating the location information to an obtaining party, wherein the communicating includes at least one of:
        transmitting a signal including data representing the location information of the mobile device to the obtaining party, and
        exposing an application programming interface (API) from which the obtaining party can access the location information of the mobile device.

8. The method of claim 6, further comprising:
    communicating the location information of the mobile device to a freight service provider for the freight service provider to have access to location information of freight carried by a vehicle carrying the mobile device.

9. The method of claim 1, further comprising:
    communicating to the user via a second automated voice message information indicating that consent to obtain the location information is revocable via the mobile device.

10. The method of claim 1, further comprising:
    receiving from the mobile device a signal including data indicating revocation of the consent to obtain the location information of the mobile device.

11. The method of claim 10, wherein signal including data indicating revocation of the consent corresponds to an SMS message including the term "hide".

12. The method of claim 10, wherein the revocation is temporary, and wherein the receiving from the mobile device the signal including data indicating revocation of the consent to obtain the location information of the mobile device includes data indicating at least one of:
    a time until which the consent to obtain the location information of the mobile device is revoked, and
    an interval of time during which the consent to obtain the location information of the mobile device is revoked;
    wherein consent is unrevoked at the time until which the consent to obtain the location information of the mobile device is revoked or upon expiration of the interval of time during which the consent to obtain the location information of the mobile device is revoked.

13. A computer implemented method for receiving from a user of a mobile device a revocation of consent to obtain location information of the mobile device, the method comprising:
    participating in a telephone call with the mobile device;
    within the telephone call, identifying the mobile device at least in part by obtaining an identifier associated with the mobile device;
    communicating to the user via an automated voice message transmitted to the mobile device during the telephone call information indicating that consent to obtain the location information is revocable via operation of the mobile device; and
    receiving from the mobile device during the telephone call a signal including data indicating revocation of the consent to obtain the location information of the mobile device.

14. The method of claim 13, wherein the telephone call is a toll free call and the identifying the mobile device includes obtaining a telephone number associated with the mobile device via automatic number identification (ANI).

15. The method of claim 13, wherein the receiving from the mobile device a signal including data indicating revocation of the consent to obtain the location information of the mobile device includes receiving data indicating that an action was performed on the mobile device.

16. The method of claim 13, wherein signal including data indicating revocation of the consent corresponds to an SMS message including the term "hide".

17. The method of claim 13, wherein the receiving from the mobile device a signal including data indicating revocation of the consent to obtain the location information of the mobile device includes receiving a voice command from the mobile device.

18. The method of claim 13, wherein the revocation is temporary, and wherein the receiving from the mobile device a signal including data indicating revocation of the consent to obtain the location information of the mobile device includes data indicating at least one of:
   a time until which the consent to obtain the location information of the mobile device is revoked, and
   an interval of time for which the consent to obtain the location information of the mobile device has been revoked;
   wherein consent is unrevoked at the time until which the consent to obtain the location information of the mobile device is revoked or upon expiration of the interval of time for which the consent to obtain the location information of the mobile device has been revoked.

19. A system for receiving user consent to obtaining location information of a mobile device, the system comprising:
   a communications interface configured to participate in a telephone call with the mobile device;
   a validation logic configured to, within the telephone call, identify the mobile device at least in part by obtaining an identifier associated with the mobile device; and
   a notification logic configured to communicate during the telephone call an automated voice message including at least one of:
      a notice including information indicating to the user of the mobile device that consenting to the obtaining of the location information of the mobile device would result in the location information of the mobile device being disclosed, and
      a location at which to find the notice, wherein the location at which to find the notice is represented by a web address corresponding to a website where, during the telephone call, the user of the mobile device can find the notice including information indicating to the user of the mobile device that consenting to the obtaining of the location information of the mobile device would result in the location information of the mobile device being disclosed;
   wherein the communications interface is configured to transmit during the telephone call the automated voice message to the mobile device, and
   wherein the communications interface is further configured to, during the telephone call, receive from the mobile device data indicating the user consent for obtaining the location information of the mobile device.

20. The system of claim 19, wherein the communications interface is configured to communicate with a toll free number, and wherein the validation logic is configured to identify the mobile device at least in part by obtaining a telephone number associated with the mobile device via automatic number identification (ANI).

21. The system of claim 19, wherein the notification logic is further configured to periodically generate a notification message indicating that the location information of the mobile device is being disclosed, and wherein the communications interface is further configured to periodically communicate the notification message to the mobile device.

22. The system of claim 19, wherein the data indicating the user consent for obtaining the location information of the mobile device includes at least one of:
   data indicating that an action was performed on the mobile device, and
   a voice command from the mobile device.

23. The system of claim 19, wherein the data received from the mobile device indicating the user consent for obtaining the location information of the mobile device corresponds to an SMS message including the term "share".

24. The system of claim 19, wherein the communications interface is further configured to, upon receipt of the data indicating the user consent for obtaining the location information of the mobile device, transmit a request for the location information of the mobile device, wherein the request includes the identifier associated with the mobile device, and wherein the communications interface is further configured to receive the location information of the mobile device.

25. The system of claim 24, wherein the communications interface is further configured to communicate the location information to an obtaining party by at least one of:
   transmitting the location information of the mobile device to the obtaining party, and
   exposing an application programming interface (API) from which the obtaining party can access the location information of the mobile device.

26. The system of claim 24, wherein the communications interface is further configured to communicate the location information of the mobile device to a freight service provider for the freight service provider to have access to location information of freight carried by a vehicle carrying the mobile device.

27. The system of claim 19, wherein the notification logic is further configured to communicate a second automated voice message indicating that consent to obtain the location information is revocable via the mobile device, and wherein the communications interface is configured to communicate to the mobile device the second automated voice message.

28. The system of claim 19, wherein the communications interface if further configured to receive revocation of the consent to obtain the location information of the mobile device.

29. The system of claim 28, wherein revocation of the consent corresponds to an SMS message including the term "hide".

30. The system of claim 28, the communications interface is further configured to receive data indicating at least one of:
   a time until which the consent to obtain the location information of the mobile device is revoked, and
   an interval of time during which the consent to obtain the location information of the mobile device has been revoked.

* * * * *